United States Patent [19]

Sturlesi et al.

[11] Patent Number: 5,802,335
[45] Date of Patent: Sep. 1, 1998

[54] CATADIOPTRIC OPTICS FOR STARING ARRAY DETECTOR SYSTEM

[75] Inventors: Doron Sturlesi, Timrat; Shimon Peled, Kiryat Bialik, both of Israel

[73] Assignee: State of Israel-Ministry of Defence, Rafael-Armament Development Authority

[21] Appl. No.: 620,070

[22] Filed: Mar. 21, 1996

[30] Foreign Application Priority Data

Apr. 12, 1995 [IL] Israel ......... 113350

[51] Int. Cl.$^6$ ......... G02B 17/00; G02B 21/00; G02B 23/00; G02B 5/08
[52] U.S. Cl. ......... 359/364; 359/363; 359/365; 359/366; 359/850; 359/727; 359/726; 359/858; 359/859; 359/861; 359/355
[58] Field of Search ......... 359/363, 364, 359/365, 366, 850, 851, 853, 726, 727, 858, 859, 861, 355

[56] References Cited

U.S. PATENT DOCUMENTS

| | | | |
|---|---|---|---|
| 4,431,917 | 2/1984 | Gibbons | 250/332 |
| 5,287,218 | 2/1994 | Chen | 359/365 |

*Primary Examiner*—Thong Nguyen
*Assistant Examiner*—Mohammad Y. Sikder
*Attorney, Agent, or Firm*—Mark M. Friedman

[57] ABSTRACT

A FLIR staring array detector system for imaging an object scene using catadioptric optics has a cold shield efficiency approaching unity. The system provides a full format image of the object scene. The catadioptric optics include reflective objective optics for providing an intermediate image of the object scene and refractive relay optics for providing the full format image. The system further includes a staring detector for receiving the full format image.

2 Claims, 3 Drawing Sheets

CATADIOPTRIC OPTICS FOR STARING ARRAY DETECTOR SYSTEM

FIELD AND BACKGROUND OF THE INVENTION

The present invention relates to staring array detector systems in general and to catadioptric optics for Forward Looking Infra-red (FLIR) staring array detector systems in particular.

Staring array detectors require an operating environment in which thermal noise is minimized by the suppression of non-scenery photons. In the case of refractive optics based FLIR staring array detector systems, this is typically achieved by ensuring that the cold shield aperture of the cold shield housing the staring array detector is the limiting aperture stop of the system. In other words, the cold shield aperture acts as the "aperture stop" of the system such that, in effect, the refractive optics based FLIR staring array detector system operates at a cold shield efficiency approaching or equal to unity. Unfortunately, refractive optics based FLIR staring array detector systems suffer from the disadvantage that they require lengthy reimaging optics.

It is well known that catadioptric optics can replace refractive optics when space limitations prevent their deployment. Hence, as shown in FIG. 1, a catadioptric optics based FLIR staring array detector system, generally denoted 10, includes a housing 12 with an infrared radiation transparent window 14 and reflective objective optics 16 for providing an intermediate image of the object scene to refractive relay optics 18 which, in turn, provide a full format image of the object scene to a staring array detector 20 housed in a cold shield 22 having an aperture 24.

It should be noted that FLIR system 10 has an optical axis of symmetry denoted I and that reflective objective optics 16 include an annular primary mirror 26 and an annular secondary mirror 28 with a central inactive area 30. Furthermore, it should be noted that the beam cross section anywhere within FLIR system 10 has an annular shape which has a central part which includes non-scenery information. Typically, the beam cross section wanders on secondary mirror 28 as shown in FIG. 2. Up to the present time, catadioptric optics based FLIR staring array detector systems have failed to achieve sufficient suppression of non-scenery photons due to two sources of extraneous radiation as follows. First, central inactive area 30 is the main source of extraneous radiation. And second, the central part of the beam cross section reflects photons from different internal parts of housing 12 onto staring array detector 20 depending on the position of the beam cross section as shown by the inner annulus denoted A. All in all, these sources of extraneous radiation have a detrimental effect on the full format image of the object scene as detected by staring array detector 20 in the form of scan noise, shading, and the like.

Therefore, there is a need for a catadioptric optics based FLIR staring array detector system which operates at a cold shield efficiency approaching or equal to unity.

SUMMARY OF THE INVENTION

The present invention is for catadioptric optics for FLIR staring array detector systems which operate at a cold shield efficiency approaching or equal to unity.

Hence, there is provided according to the teachings of the present invention, a FLIR staring array detector system for imaging an object scene, the system comprising: (a) catadioptric optics for providing a full format image of the object scene, the catadioptric optics including reflective objective optics for providing an intermediate image of the object scene and refractive relay optics for providing the full format image; and (b) a staring detector for receiving the full format image, the system characterized by having a cold stop efficiency approaching or equal to unity.

According to a further feature of the present invention, the catadioptric optics includes a secondary mirror with a central inactive area having a concave reflective surface with a radius of curvature substantially equal to the distance between the intermediate image and the central inactive area.

According to a further feature of the present invention, the catadioptric optics includes a secondary mirror which acts as an "intermediate aperture stop" of the system.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of catadioptric optics for FLIR staring array detector systems operating at a cold shield efficiency approaching or equal to unity.

The principles and operation of the catadioptric optics for FLIR staring array detector systems according to the present invention may be better understood with reference to the drawings and the accompanying description.

Figure 1:
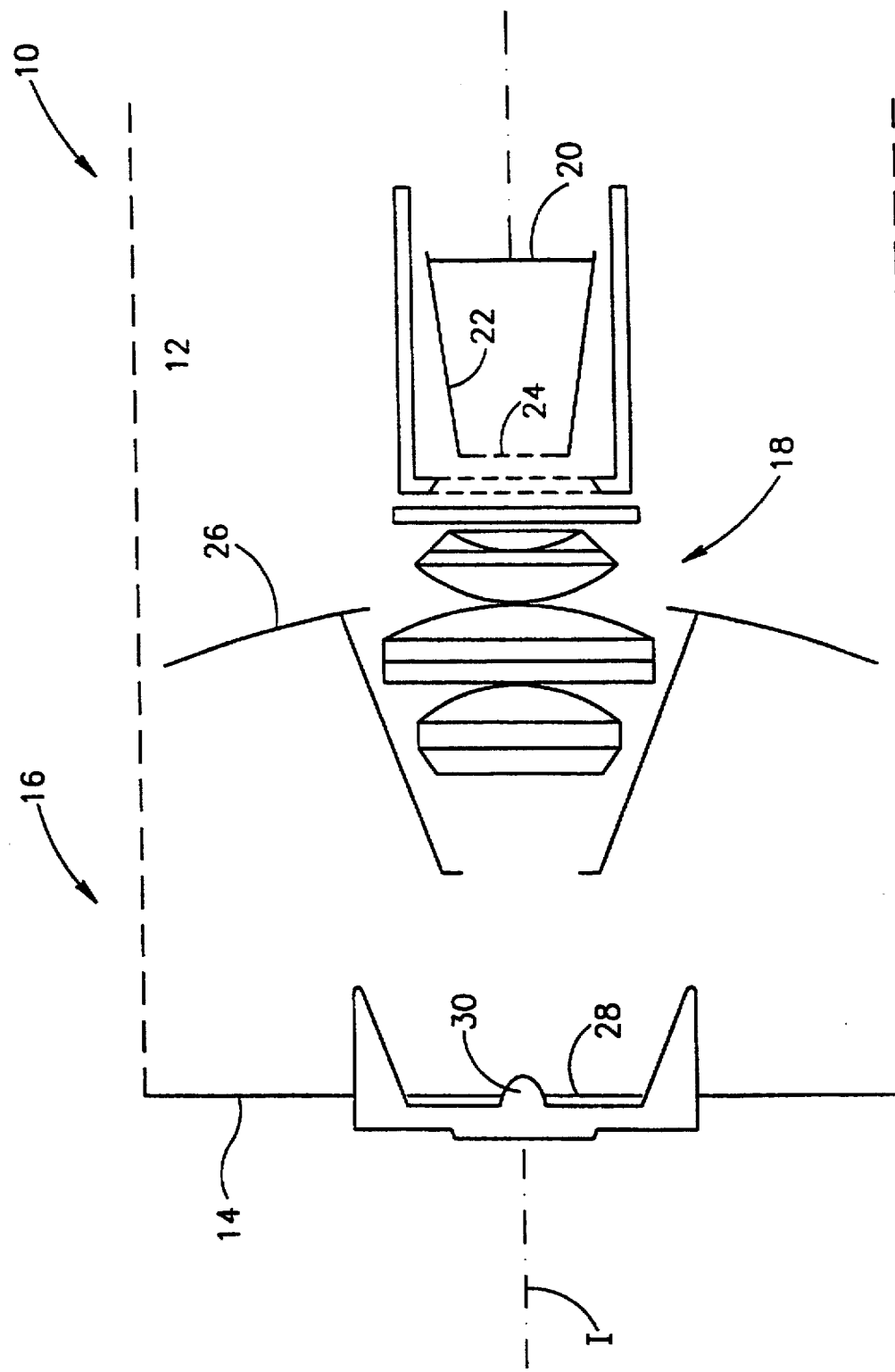
FIG. 1 is a schematic view of conventional catadioptric optics for FLIR staring array detector systems having a cold shield efficiency of substantially less than unity.
Figure 2:
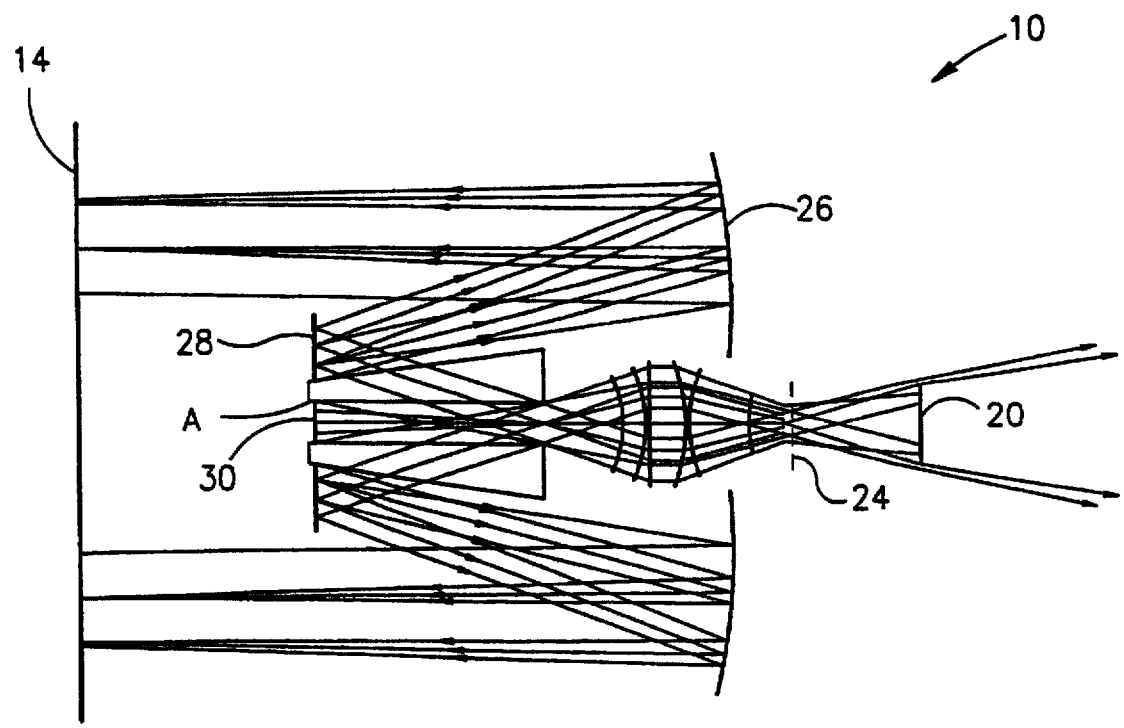
FIG. 2 is a schematic view of conventional catadioptric optics for FLIR staring array detector system of FIG. 1 showing the inner annulus of extraneous radiation due to the wandering of the beam on the secondary mirror of the system.
Figure 4:
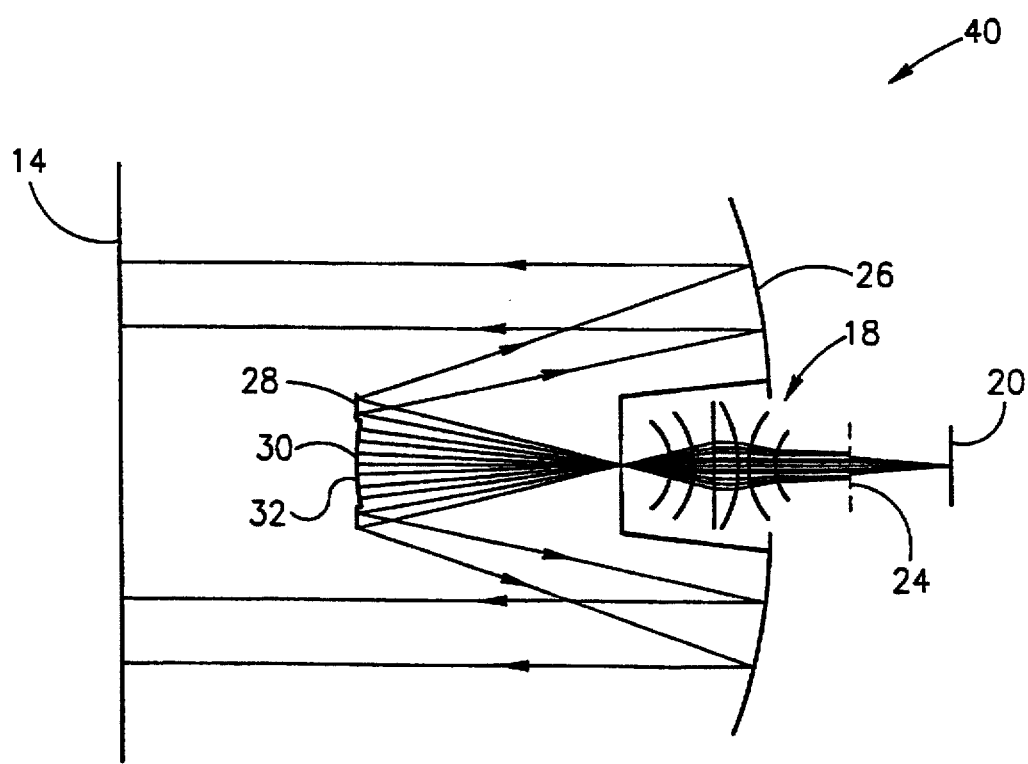
FIG. 4 is a schematic view of catadioptric optics for FLIR staring array detector systems of FIG. 3 showing the design considerations to suppress extraneous radiation reaching the staring detector.
Figure 3:
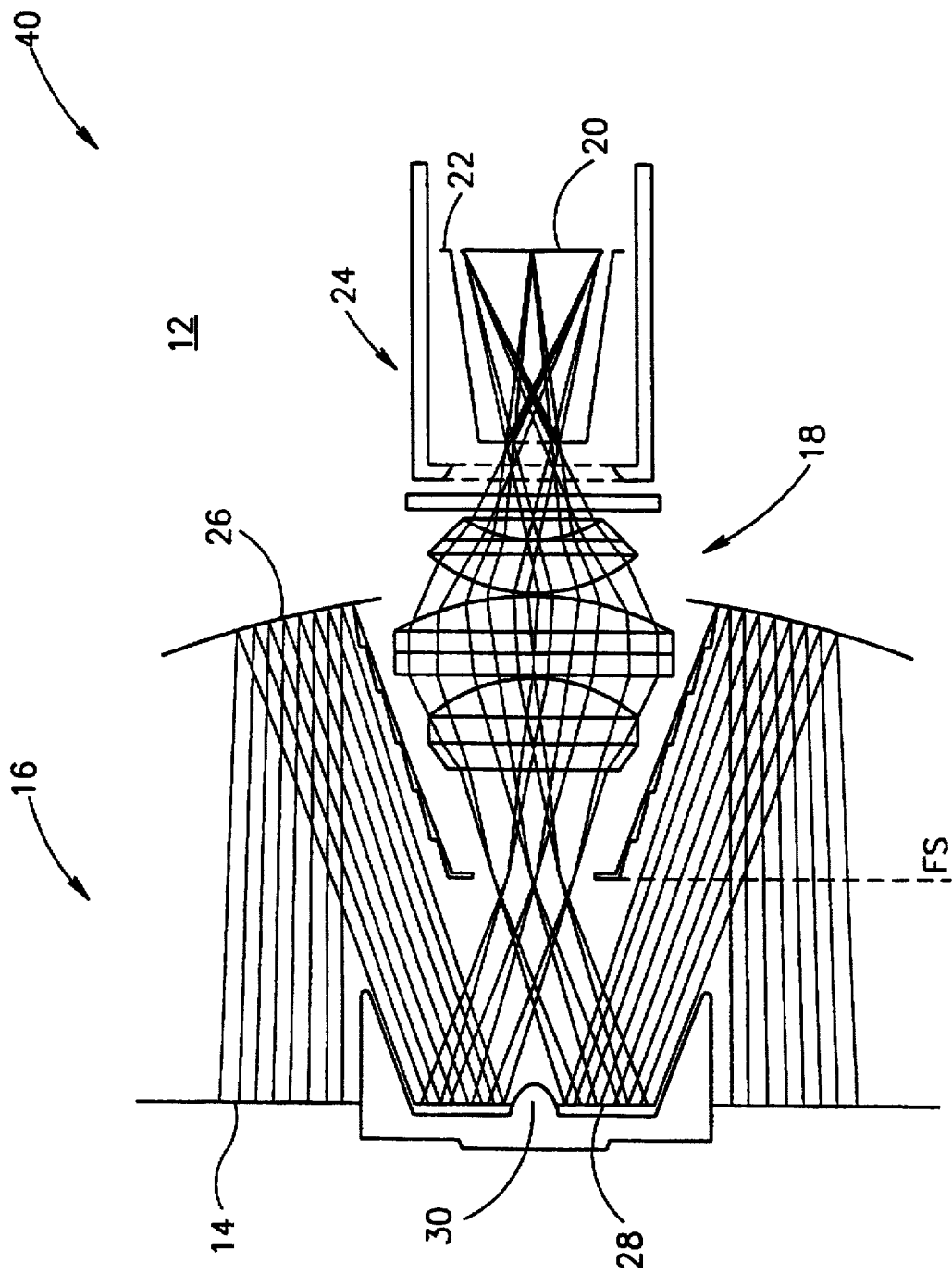
FIG. 3 is a schematic view of catadioptric optics for FLIR staring array detector systems constructed and operative according to the present invention for achieving a cold shield efficiency approaching or equal to unity.

Referring now to the drawings, FIGS. 3 and 4 depict catadioptric optics for FLIR staring array detector systems, generally denoted 40, constructed and operative according to the teachings of the present invention, operating at a cold shield efficiency approaching or equal to unity.

As described earlier with reference to FLIR system 10, catadioptric optics based FLIR staring array detector system 40 includes a housing 12 with an infrared radiation transparent window 14, reflective objective optics 16 for providing an intermediate image of the object scene to refractive relay optics 18 which in turn provide a full format image of the object scene on a staring array detector 20 housed in a cold shield 22 having an aperture 24. Furthermore, FLIR system 10 has an optical axis of symmetry denoted I and reflective objective optics 16 include an annular primary mirror 26 and an annular secondary mirror 28 with a central inactive area 30.

Broadly speaking, the cold shield efficiency of catadioptric optics based FLIR staring array detector system 40 is achieved by the incorporation of two novel design features so as to ensure that staring array detector 20 only detects object scene radiation. These design features of FLIR system 40 are best demonstrated by depicting staring array detector 20 as a source of radiation such that the direction of the rays shown in FIG. 4 are in a reverse direction to the radiation from an object scene.

Hence, it is a particular feature of FLIR system 40 that secondary mirror 28 acts as an "intermediate aperture stop" of FLIR system 40. This is achieved by ensuring that secondary mirror 28 is the image of the cold shield opening 24 which, as in the case of refractive optics based FLIR staring array detector systems, acts as the aperture stop of FLIR system 40. It is this feature that the beam cross section is fixed at all times on secondary mirror 28 or, in other words, that there is no beam wander on secondary mirror 28.

And second, it is a further feature of FLIR system 40 that staring array detector 20 detects central inactive area 30 as a cold surface rather than as a warm reflective source of extraneous radiation. This is achieved by providing central inactive area 30 with a reflective concave front surface 32 having a radius of curvature corresponding to the distance between the center of the intermediate image and central inactive area 30 such that the cold surface detected by staring array detector 20 is, in effect, a reflection of the cold focal plane.

It can thus be readily appreciated that a catadioptric optics based FLIR staring detector system embodying both of the above described design improvements will possess a very high cold shield efficiency approaching or equal to unity.

While the invention has been described with respect to a limited number of embodiments, it will be appreciated that many variations, modifications and other applications of the invention may be made.

What is claimed is:

1. A FLIR staring array detector system for imaging an object scene, the system comprising:

(a) catadioptric optics for providing a full format image of the object scene, said catadioptric optics including reflective objective optics for providing an intermediate image of the object scene, refractive relay optics for providing said full format image, a cold shield with a cold shield opening and a cold shield efficiency, and a cold focal plane, said reflective objective optics including an annular primary mirror and an annular secondary mirror with a central inactive area, said central inactive area including a reflective concave front surface with a radius of curvature substantially equal to the distance between said intermediate image and said central inactive area, such that said staring detector detects a reflection of said cold focal plane; and (b) a staring detector for receiving said full format image, the system characterized by having the cold shield efficiency approaching unity.

2. The system as in claim 1, wherein said annular secondary mirror acts as an "intermediate aperture stop" of the system, such that said annular secondary mirror is the image of the cold shield opening.

* * * * *